3,798,316
PURIFICATION OF CLAUS PLANT TAIL GAS BY
WATER WASHING
David K. Beavon, Los Angeles, Calif., assignor to The
Ralph M. Parsons Company, Los Angeles, Calif.
Filed Sept. 8, 1972, Ser. No. 287,589
Int. Cl. C01b 17/04
U.S. Cl. 423—574                                   5 Claims

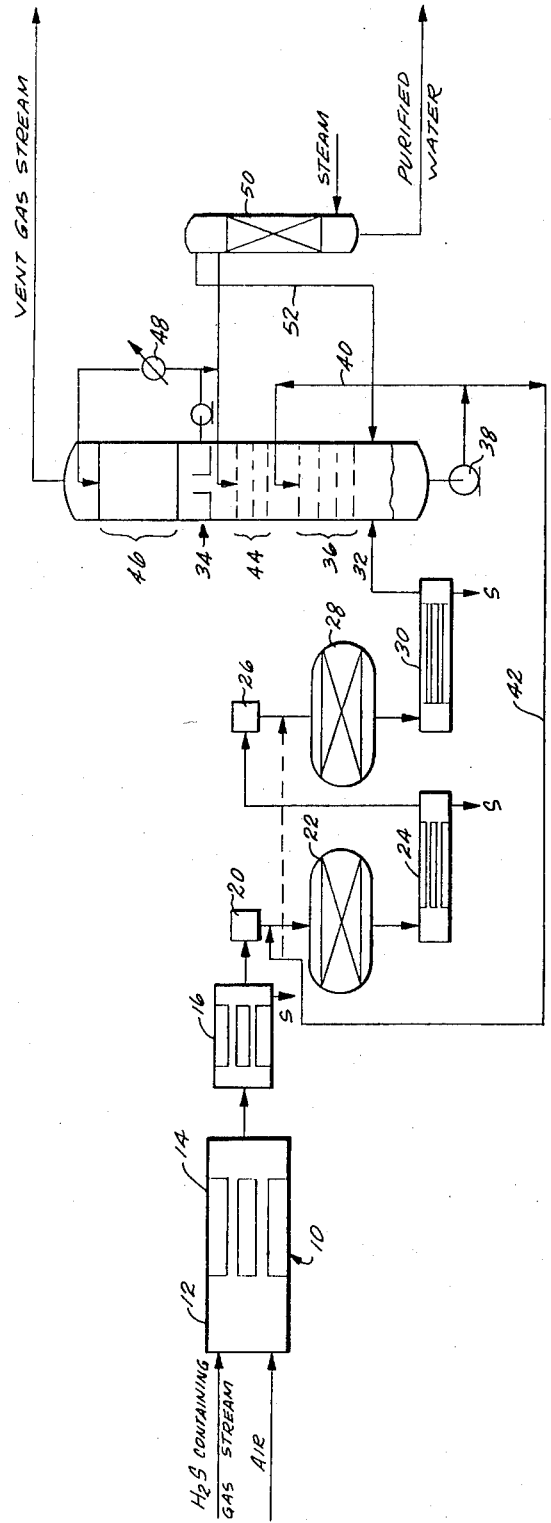

ABSTRACT OF THE DISCLOSURE

The effluent from a Claus sulfur plant is passed to a relatively high temperature reaction-absorption zone where, in the presence of water as the absorption-reaction medium, there is formed sulfur by reaction of the hydrogen sulfide and sulfur dioxide and other sulfurous compounds such as polythionic and sulfurous acids.

The water containing sulfur and the other sulfurous compounds is recycled back to one of the Claus conversion stages where the formed sulfurous compounds dissociate into sulfur, hydrogen sulfide and sulfur dioxide for conversion to elemental sulfur in the Claus reactor.

The residual gas stream is then passed to a second absorption zone to remove residual sulfur dioxide and to a final water condensation zone before being vented to the atmosphere.

BACKGROUND OF THE INVENTION

In the operation of a modified Claus sulfur plant, about 94% of the sulfur compounds contained in a feed gas stream are ultimately converted to sulfur, the balance being emitted to the atmosphere as sulfur dioxide which is a pollutant. The addition of another catalytic stage raises the conversion to about 97%. This amount of conversion, however, is still too low and the loss is costly and hazardous.

In the operation of a typical Claus plant containing two stages, the gases leaving the final sulfur condenser contain some uncondensed sulfur vapor, unreacted hydrogen sulfide, sulfur dioxide and usually some carbonyl sulfide and the carbon disulfide. The total of the sulfur compounds in the effluent from the condenser in what may be termed the "tail gas stream" is generally in the range of 1–3% by volume, the balance being about one-third water and nitrogen introduced with the air during the initial thermal reaction.

It would be desirable to reduce the $H_2S$ and $SO_2$ contents much below the levels indicated, but it is not generally practical to do so by adding a further Claus stage because the Claus reactions generally can be worked only at temperatures above 400° F. At such temperatures the equilibrium for the reactions has been closely approached when the overall conversion of sulfur reaches the level of about 97%.

Higher conversions could be achieved by carrying out the reactions at lower temperatures where the reaction equilibrium is more favorable. However, at temperatures below the boiling point of water, water condenses from the vapors and the reaction products include a complex mixture of highly corrosive sulfur compounds in water.

Efforts to operate in this temperature region have, however, been made. For example, the Townsend process using an ethylene glycol solution to absorb $H_2S$ and $SO_2$ and act as the reaction medium for the formation of sulfur has been employed.

Other processes of a similar nature employing sulfolane or ethylene glycols as solvents working above or below the water condensation temperature have also been employed.

Up until now, such processes have had to work above the condensation temperature of water in order to avoid extreme corrosion conditions and also to avoid the problems involved in disposal of the waste solutions.

Operation at the condensation temperature of water without other chemicals being added has been attempted and abandoned because of fouling of the condensing equipment by elemental sulfur and disposal of the corrosive sulfurous condensate produced, which is a complex solution containing polythionic acids, sulfurous acids, and elemental sulfur, which constitutes a difficult waste disposal problem.

SUMMARY OF THE INVENTION

According to the present invention, there is provided a method for substantially reducing sulfur losses presently contained in the effluent of a Claus type sulfur plant.

The process consists of contacting the effluent gas stream from the final sulfur condensation stage of the Claus process with an aqueous absorption-reaction medium maintained at a temperature approximately equal to the dew point of water in the gas stream where dissolved sulfur dioxide and hydrogen sulfide react to form sulfur, along with the formation of other sulfurous compounds including polythionic and sulfurous acids.

At least a portion of the resultant stream, which is corrosive in nature, is recycled by suitable equipment back to one of the Claus reactors where the water present is vaporized and the polythionic acids, sulfurous acid and other sulfurous components are dissociated to form hydrogen sulfide and sulfur dioxide which are converted to elemental sulfur in the Claus reactor. This disposes of the corrosive solution which would otherwise present a water pollution problem.

The gas stream is then passed to a second absorption zone where it is brought into contact with water in order that the residual sulfur dioxide contained in the gas stream will be absorbed. The water containing sulfur dioxide from the second absorption zone is passed to the absorption-reaction zone and combined with the aqueous media present in the absorption-reaction zone.

After passing through the second absorption zone, the gas stream now free of sulfur dioxide is then passed into a cooling zone where, by contact with water, the residual water contained in the gas stream is condensed, and the resultant gas stream free of sulfur dioxide passed to an incinerator or to vent.

The water stream from the third condensation zone is, in the preferred operation, split. A portion is returned to the system for use as the water for absorbing residual sulfur dioxide from the gas stream and for use in the absorption-reaction zone. The balance is steam stripped of hydrogen sulfide for recovery as purified water. The hydrogen sulfide which is separated from the water is cycled back to the absorption-reaction zone for reaction with sulfur dioxide to form additional sulfur.

By the practice of this invention, there is eliminated a material water pollution problem since the sulfurous compounds formed in the absorption-reaction zone are recycled back to the Claus sulfur production system. Secondly, since the process gas stream is cooled to condense water by contact with the water it is unnecessary to pass the process gases through a heat exchanger which would be subject to plugging.

Since all of the sulfur dioxide has been removed from the gas stream, prior to the final condensation of water, condensation of water can occur without the formation of corrosive polythionic acids and sulfurous acids.

By the practice of the process of this invention, the net sulfur conversion for a Claus sulfur plant can be raised to as high as 99% and the problems of sulfur emissions to the atmosphere materially reduced.

DRAWING

The attached drawing schematically illustrates one method of carrying out the process of this invention.

DESCRIPTION

According to the present invention there is provided a process for increasing the amount of sulfur recovered in a Claus sulfur plant to significantly high levels and reduce thereby the amount of sulfur present for emission to the atmosphere.

With reference to the drawing, the first phase of the process is conventional to a modified Claus plant for sulfur production. It consists, first, of passing a gas stream containing hydrogen sulfide and/or carbonyl sulfide and air into the combined furnace-waste heat boiler 10, where the gas stream containing $H_2S$ and/or COS is reacted with air in a flame zone 12 to form hydrogen sulfide and sulfur dioxide in the desired proportion of 2 to 1.

Elemental sulfur may also be formed by reaction of $H_2S$ and $SO_2$ in the flame zone.

If carbon compounds are present in the same stream COS and $CS_2$ will be formed but there the amount formed will be generally small and of little consequence.

The products from the flame zone 12 are cooled in waste heat boiler 14 where the steam is generated, then further cooled in a first sulfur condenser 16 where sulfur is collected in the liquid state and withdrawn.

The gases leaving condenser 16 are then passed through reheater 20 where the temperature of the gas stream is raised sufficiently to initiate the catalytic Claus reaction of $H_2S$ and $SO_2$ to form sulfur in reactor 22.

The effluent from the first Claus reactor 22 is then passed to a second sulfur condenser 24 to a second reheater 26 and yet another catalytic Claus converter 28, and on to sulfur condenser 30. The gas stream may, if desired, be passed to an additional Claus converter and condensation stage if overall conversion is still below about 97%.

In general, the Claus reactions are carried out at a temperature of above about 400° F. and for an atmospheric pressure feed, sulfur is condensed, typically, at a temperature of 280° F.–300° F. to avoid the formation of solid sulfur which would obstruct the heat transfer and cause plugging.

Because of the high temperature at which sulfur condensation occurs, namely, that at least sufficient to avoid the formation of solid sulfur and its collection in the liquid state, the gases leaving the condenser contain some uncondensed sulfur vapor along with unreacted hydrogen sulfide and sulfur dioxide and usually some COS and $CS_2$.

The total of the foregoing sulfur compounds is generally in the range of 1%–3% by volume of the tail gas leaving condenser 30, the remainder being about one-third water and the balance the nitrogen introduced with air used for the thermal reaction in flame zone 12.

In accordance with the practice of this invention, the stream from condenser 30 is passed by line 32 to the combined absorption-reaction, absorption and condensation tower 34.

The gas stream is first brought into contact with an aqueous reaction medium in absorption-reaction zone 36, maintained at a temperature which is approximately equal to or slightly above the dew point of water in the process gas stream. For a process operated at ambient pressure, this zone is maintained at a temperature between 150°–160° F. Because the temperature in zone 36 is approximately at the dew point of water in the gas stream, equilibrium is favored for completion of the reaction of absorbed $H_2S$ and $SO_2$ to form elemental sulfur and the production of elemental sulfur can be increased to a level about 99% for the total process.

The nature of the sulfur which is formed, however, is in a finely divided form and associated with complex sulfur compounds such as sulfurous acid, polythionic acids and the like and is of little or no value. In addition, it is highly corrosive in nature and would present, if disposed of, a considerable water pollution problem.

Instead, the aqueous medium containing the sulfur and sulfurous products is removed from the base of the condensing absorption reaction unit 34, passed by pump 38 and split. A portion is recycled along line 40 back to zone 36 and the balance passed by line 42 to the feed to one or more of the Claus units 22 and 28.

There the water in the gas stream is vaporized, the sulfurous compounds such as sulfurous acid and polythionic acids dissociated to form hydrogen sulfide and sulfur dioxide which react to form additional sulfur conserving thereby the sulfur fed to the process.

The gas stream, after passing to absorption reaction zone 36 passes to absorption zone 44 where the residual sulfur dioxide remaining in the gas stream is removed by contact with water. The water from absorption zone 44 then enters absorption-reaction zone 36 for absorption of additional sulfur dioxide and hydrogen sulfide and to permit their reaction to form sulfur for recycle back to the Claus conversion stages. The water in absorption zone 44 is maintained at a temperature which is approximately equal to or slightly below the dew point of water in the gas stream.

The gas stream from sulfur dioxide absorption zone 44 then passes to water condensation zone 46, where water is condensed free of sulfur dioxide although it may contain some residual hydrogen sulfide. The condensate, however, is non-corrosive in nature and can be readily handled.

Water from condensation zone 46 is split. A portion of it is passed through cooled 48 for recycle back to water condensation zone 46.

The balance which represents the net amount of water condensed from the gas stream is further split. A portion is used as the feed water to sulfur dioxide absorption zone 44 and the balance fed to steam stripper 50 where hydrogen sulfide is stripped from the gas stream and purified water recovered as a product. The hydrogen sulfide extracted from the gas stream in steam stripper 50 is passed by line 52 to absorption-reaction zone 36 for reaction with sulfur dioxide.

In the practice of this invention, because absorption reaction zone 36 is at approximately the dew point of water in the gas stream, equilibrium is favored for the completion of the reaction of $H_2S$ with $SO_2$ to form elemental sulfur. Since this sulfur along with the sulfurous products formed are recycled back to a Claus unit for sulfur production, the net production of sulfur in the process can be increased to 99 percent.

In addition, since there is ultimately a complete recycle of the finely divided sulfur and sulfurous compounds to a Claus reaction stage, there is no disposal problem to contend with and water pollution is avoided.

The recycle stream as well as the liquor in reaction-absorption zone 36 are corrosive in nature. Care must therefore be taken in selection of materials of construction. For instance, pump 38 may be made of graphite and piping and lining employed for absorption-reaction zone 36 and possibly $SO_2$ absorption zone 44 will have to be made of corrosion resistant materials, or lined with Teflon® or glass-fiber reinforced plastics. In the zone where the sulfurous condensate is evaporated into the hot process gas stream, ceramic materials may be employed. However, the benefits gained by conversion of sulfur and reduction of air pollutants far outweighs the cost of using these materials.

What is claimed is:

1. In a process for the production of sulfur where a gas stream containing hydrogen sulfide and sulfur dioxide are brought into contact with a plurality of Claus conversion stages to form sulfur with liquid sulfur condensation occurring in a sulfur condensation stage after each Claus conversion stage, the improvement comprises continuously:
  (a) passing the gas stream from the final sulfur condensation stage to an absorption-reaction zone maintaining a temperature approximately equal to the dew point of water in the gas stream in which hydrogen sulfide and sulfur dioxide are absorbed in an aqueous reaction medium and converted to elemental sulfur and sulfurous compounds including sulfurous acid and polythionic acids;
  (b) passing at least a portion of the aqueous reaction medium containing formed elemental sulfur and sulfurous compounds to at least one of said Claus conversion stages where water is vaporized and the contained sulfurous compounds are dissociated into hydrogen sulfide and sulfur dioxide for conversion to elemental sulfur in the Claus conversion stage;
  (c) passing the gas stream from the absorption-reaction zone to a sulfur dioxide absorption zone where the gas stream is contacted with water to essentially completely separate residual sulfur dioxide from the gas stream;
  (d) passing the water containing sulfur dioxide from the sulfur dioxide absorption zone to the absorption reaction zone; and
  (e) passing the gas stream from the sulfur dioxide absorption zone to a condensation zone where residual water contained in the gas stream is condensed by contact with water maintained at a temperature below the dew point of water in the gas stream.

2. A process as claimed in claim 1 in which a portion of the condensed water is passed to the sulfur dioxide absorption zone.

3. A process as claimed in claim 1 in which sulfur dioxide absorption zone is maintained at approximately the dew point of water.

4. A process as claimed in claim 1 in which the gas stream entering the absorption-reaction zone is at atmospheric pressure and the absorption-reaction zone is maintained at a temperature of from about 150 to about 160° F.

5. A process as claimed in claim 3 in which the gas stream entering the absorption-reaction zone is at atmospheric pressure and the absorption-reaction zone is maintained at a temperature of from about 150 to about 160° F.

References Cited
UNITED STATES PATENTS

| | | | |
|---|---|---|---|
| 2,413,714 | 1/1947 | Keeling | 423—576 |
| 2,835,559 | 5/1958 | Bahr | 423—574 X |

FOREIGN PATENTS

| | | | |
|---|---|---|---|
| 905,365 | 9/1962 | Great Britain | 423—574 |
| 797,739 | 10/1968 | Canada | 423—574 |

GEORGE O. PETERS, Primary Examiner